United States Patent Office 2,742,471
Patented Apr. 17, 1956

2,742,471

PREPARATION OF DIHYDRO DERIVATIVES OF CHLORINATED ANTHRAQUINONEAZINES

Justin A. McSheehy, Somerville, and William A. Raimond, North Plainfield, N. J., assignors to American Cyanamid Company, New York, N. Y., a corporation of Maine No Drawing. Application October 5, 1953,
Serial No. 384,342

11 Claims. (Cl. 260—265)

This invention relates to the preparation of chlorinated N,N'-dihydro-1,2,2',1'-anthraquinoneazines and more particularly is concerned with the preparation of such compounds in an improved manner whereby oxidation of the dihydroazine to the azine form of the dye is prevented.

Anthraquinoneazines constitute one of the most important classes of vat dyes because of their good fastness properties. The chlorinated derivatives of these dyes, particularly 3,3'-dichloroindanthrone and the chlorinated derivative of unknown structure containing 3.7% chlorine, are especially important because they combine the high lightfastness properties possessed by the parent dye with maximum bleachfastness.

The general method for preparing the chloroindanthrones is by direct chlorination of indanthrone with a chlorinating agent such as gaseous chlorine in sulfuric acid solution. The chlorination process is not without difficulty, however, because when the indanthrone has been chlorinated essentially to the dichloro derivative, there is still present in the reaction mixture sufficient chlorine to oxidize the hydroazine to the azine form of the dye. Since the oxidized azine has little marketable value, being more expensive to use due to the need for twice as much sodium hydrosulfite in vatting, and must be therefore reduced to the N-dihydro form, various attempts have been made in the past to effect the desired reduction.

It has been proposed to accomplish this reduction so as to obtain the desired greenish-blue dyestuff by a vatting and mild reoxidization step after isolation of the product from the sulfuric acid. This method possesses the disadvantage, however, of requiring an extra operation in the production of the dyestuff. It has also been proposed to convert the azine to the desired dihydroazine form by the addition of various reducing agents such as ferrous sulfate, or aluminum powder, which are added to the sulfuric acid solution. This method is disadvantageous, however, because not only are additional and costly chemicals needed, but again an extra step is involved which is undesirable in commercial operations. In addition, certain of these reagents such as aluminum can overreduce the dye irreversibly.

In accordance with the present invention, we have now found that it is possible to prevent the formation of the azine from ever taking place, and, consequently, no added reduction step is necessary as is true with the prior art methods. This is accomplished by adding to the sulfuric acid solution of the chloroindanthrone in the dihydroazine form, a chlorine acceptor as more particularly hereinafter described. The chlorine acceptor appears to preferentially absorb the excess chlorine present in the sulfuric acid solution before the chlorine can oxidize the dihydroazine to the azine form of the vat dye. The solution can then be drowned, precipitating the product as the dihydroazine.

It is a surprising feature of the present invention that the chlorine in the reaction mixture will react with the chlorine acceptor rather than oxidizing the dihydroazine to the azine. The dihydroazine is exposed to the action of chlorine all through the chlorination step, and it is surprising that the addition of a chlorine acceptor at this late stage in the exposure of the dyestuff molecule to chlorine would protect such a sensitive group as the dihydroazine from the oxidative action of chlorine. It would have been anticipated that the chlorine would first oxidize the dihydroazine to the azine before attacking the nucleus of the dyestuff to form the chloroindanthrone. It is not known why the chlorine acceptors of this invention react in this manner and no theory can be advanced thereon. At any rate, it is clear that they in no way serve as reducing agents as do the compounds of the prior art.

A wide variety of chlorine acceptors may be used in carrying out the present invention. Suitable chlorine acceptors are certain unsaturated compounds as for example, the olefinic hydrocarbons such as ethylene, propylene, butylene, amylene, hexylene, phenylethylene, etc.; the diolefins such as butadiene and substituted butadienes, isoprene, hexadienes, etc.; monocyclic terpenes which are olefinic in character such as alpha terpine, menthene, limonene, terpinenes, phellandrenes, carvestrene, sylvestrene, etc.; the cycloalkenes and cycloalkadienes such as cyclohexene, cyclohexadiene, dicyclopentadiene, etc. We may also use naturally occurring mixtures of the above compounds such as turpentine.

Another suitable class of chlorine acceptors are the phenols, as, for example, the monohydric phenols and especially the substituted phenols such as the cresols and xylenols. Polyphenols such as pyrocatechol, resorcinol and pyrogallol are also useful. Also operable are the naphthols, i. e., alpha- and beta-naphthol. As is true with the olefinic compounds mentioned above it is not necessary to use the pure phenolic compounds as such, but naturally occurring and cheaper mixtures of phenols may be advantageously used, such as, for example, tar acids, mixed cresols from tar crudes, etc. containing phenolic bodies.

The chlorine acceptor should be used in amounts in excess of 3% based on the weight of the dye solids, in order to obtain the dihydroazine. In practice, usages of the order of 10 to 15%, based on the weight of the dye solids, are employed.

It is further advantage of the present invention that no additional operations are involved in the production of the dyestuff. The chlorine acceptor is simply added to the sulfuric acid solution of the chlorinated anthraquinonedihydroazine. The product may thereafter be isolated in a conventional manner, i. e., drowning in water and precipitating the product as the dihydroazine. Although it is customary to heat the sulfuric acid solution of the dihydroazine before drowning in order to produce a very fine state of subdivision in the precipitated product, the step of heating is not necessary in the practice of this invention for the absorption of the chlorine by the chlorine acceptors since the acceptors absorb chlorine readily at room temperatures as well as at elevated temperatures.

The invention will be described in greater detail in conjunction with the following specific examples in which the parts are by weight unless otherwise specified.

*Example 1*

111 parts of a chlorinated anthraquinone dihydroazine solution in sulfuric acid (prepared by chlorinating anthraquinone dihydroazine in sulfuric acid until it is essentially the dichloro compound containing about 13% chlorine), consisting essentially of 7.9 parts of dichloro anthraquinone dihydroazine dissolved in approximately 103 parts of about 94% sulfuric acid but containing residual quantities of chlorine and HCl, is heated to 60° C. One part of a crude mixture of cresols (obtained from coal tar and having the approximate composition—orthocresol 2.9%, meta-cresol 62.0%, para-cresol 30%, xylenol 5.1%) is added and the mixture is stirred a short time at 70° C. It is drowned in 790 parts of water at room temperature. The drowned product is blue in color. It can be blended without further treatment, with respect to its chemical structure, into a commercial dyestuff.

If the above procedure is followed omitting the mixed cresols, the product is green in color. This is identified by spectroscopic data as the azine form while the blue product produced above is identifiable similarly as the dihydroazine form.

Example 2

The procedure of Example 1 is followed except that 68.5 parts of the crude sulfuric acid chlorination mixture is treated with one part of a mixture of crude tar acid, which analyzes 14.7% water, 42.2% phenol, 7.6% orthocresol, 17.9% meta- and para-cresol, 4.4% xylenols and 13.2% xylenol pitches. The product obtained by this treatment is again a blue color, identifiable spectroscopically as the dihydroazine, and can be blended directly to form a commercial dyestuff.

Example 3

The procedure of Example 1 is followed except that 140 parts of the crude chlorination charge is treated with one part of turpentine. Again a blue product, identifiable spectroscopically as the dihydroazine, is obtained.

Example 4

The procedure of Example 1 is followed except that the mixed cresols are replaced with one part of dicyclopentadiene. The product obtained is blue in color, identifiable spectroscopically as the dihydroazine.

Example 5

The procedure of Example 1 is followed replacing the mixed cresols with cyclohexene which is added to the sulfuric acid solution of the chlorinated anthraquinone dihydroazine at room temperature (25° C.) instead of at 60° C. as in Example 1. Again a blue product is obtained which is identifiable spectroscopically as the dihydroazine.

Example 6

The procedure of Example 1 is followed replacing the mixed cresols with isoprene. Again a blue product, identifiable spectroscopically as the dihydroazine, is obtained. Similar results are obtained by the use of styrene, maleic anhydride or resorcinol.

Example 7

The procedure of Example 1 is followed using phenol in place of the mixed cresols and heating a slightly longer time. The blue product is identifiable spectroscopically as the dihydroazine.

Example 8

To 80 parts of a 94–94.5% sulfuric acid solution of chlorinated anthraquinone dihydroazine (prepared by chlorinating anthraquinone dihydroazine in sulfuric acid until it is essentially the chloro compound containing about 3.7% chlorine), there is added at 58° C. one part of mixed cresols. The sulfuric acid solution contains 5 parts of chlorinated purified indanthrone in solution in 75 parts of 94–94.5% sulfuric acid. After adding the mixed cresols the charge is heated to 70° C. and stirred for a short time at 70° C. and then drowned into 153 parts of boiling water. A blue colored slurry is obtained indicating the product to be in the dihydroazine form. The product is isolated by filtering and washing. The press cake is then formulated into a dye paste. It is identifiable spectroscopically as the dihydroazine.

If the above procedure is followed with the exception that the mixed cresols are not added, a green colored product is obtained on drowning. This is identifiable spectroscopically as the azine form.

Example 9

52 parts of a 94% sulfuric acid solution of chlorinated anthraquinone dihydroazine (prepared by chlorinating anthraquinone dihydroazine in sulfuric acid solution until it is essentially the dichloro compound containing about 13% chlorine), consisting of about 3.25 parts of dichloro anthraquinone dihydroazine dissolved in approximately 48.75 parts of the acid and containing residual amounts of chlorine and HCl, is removed from the chlorination mixture. It is heated to 57° C. and one part of beta-naphthol is added. It is then heated to 70° C. for a short time. It is drowned in 47 parts of boiling water. The slurry is then drowned in a large volume of water. The drowned product is blue in color and, after isolation by filtration, is identifiable spectroscopically as the dihydroazine. When the procedure is followed but omitting the beta-naphthol, the product is green and is identifiable spectroscopically as the azine.

We claim:

1. The process of preparing chlorinated N,N'-dihydro-1,2,2',1'-anthraquinoneazines wherein an anthraquinone dihydroazine is chlorinated in sulfuric acid, the improvement which comprises adding a chlorine acceptor to the sulfuric acid solution of the chlorinated anthraquinonedihydroazine so as to prevent oxidation of the dihydroazine to the azine, the chlorine acceptor being selected from the group consisting of phenols of less than three rings, cycloalkenes having at least one double bond, and lower alkenes having at least one double bond, said chlorine acceptor being stable in the presence of sulfuric acid, and reacting with chlorine dissolved in sulfuric acid.

2. The process according to claim 1 wherein the chlorine content of the chlorinated anthraquinonedihydroazine is about 13%.

3. The process according to claim 1 wherein the chlorine content of the chlorinated anthraquinonedihydroazine is about 3%.

4. The process according to claim 1 in which the chlorine acceptor is a phenol of less than three rings.

5. The process according to claim 1 wherein the chlorine content of the chlorinated anthraquinonedihydroazine is about 13%, and the chlorine acceptor is mixed cresols.

6. The process according to claim 1 wherein the chlorine content of the chlorinated anthraquinonedihydroazine is about 3%, and the chlorine acceptor is mixed cresols.

7. The process according to claim 1 wherein the chlorine content of the chlorinated anthraquinonedihydroazine is about 13%, and the chlorine acceptor is phenol.

8. The process according to claim 1 wherein the chlorine acceptor is a cycloalkene having at least one double bond.

9. The process according to claim 1 wherein the chlorine content of the chlorinated anthraquinonedihydroazine is about 13%, and the chlorine acceptor is dicyclopentadiene.

10. The process according to claim 1 in which the chlorine acceptor is a lower alkene having at least one double bond.

11. The process according to claim 1 wherein the chlorine content of the chlorinated anthraquinonedihydroazine is about 13%, and the chlorine acceptor is isoprene.

No references cited.